United States Patent [19]

Krasin et al.

[11] 3,886,321

[45] May 27, 1975

[54] RINGING GENERATOR FOR TELEPHONE STATION TERMINAL

[75] Inventors: Lester Q. Krasin; Robert D. McCallum, both of Tulsa, Okla.

[73] Assignee: Seismograph Service Corporation, Tulsa, Okla.

[22] Filed: Nov. 5, 1973

[21] Appl. No.: 413,143

[52] U.S. Cl. .......... 179/84 R

[51] Int. Cl. .......... H04m 1/26; H04q 9/00

[58] Field of Search .......... 179/84 T, 170.8, 84 R, 179/170.2, 2.5 R

[56] References Cited

UNITED STATES PATENTS

| | | | |
|---|---|---|---|
| 3,510,584 | 5/1970 | Krasin | 179/2.5 R |
| 3,624,300 | 11/1971 | Krasin | 179/2.5 R |
| 3,639,692 | 2/1972 | Krasin | 179/2.5 R |
| 3,808,379 | 4/1974 | Lind | 179/84 T |

FOREIGN PATENTS OR APPLICATIONS

| | | |
|---|---|---|
| 1,185,678 | 3/1970 | United Kingdom |

*Primary Examiner*—Kathleen H. Claffy
*Assistant Examiner*—Joseph Popek
*Attorney, Agent, or Firm*—W. F. Norris

[57] ABSTRACT

In the preferred embodiment of the invention disclosed herein, a ringing voltage generator responsive to a 300 Hz modulated carrier wave and powered by a local power supply is provided at carrier telephone system subscriber station terminal. Time constant means are provided within the ringing voltage generator to prevent sporadic ringing voltage pulses being generated in response to noise impulses on the telephone cable. Biasing means are provided for deactivating the ringing voltage generator when the telephone handset is off its hook.

5 Claims, 2 Drawing Figures

RINGING GENERATOR FOR TELEPHONE STATION TERMINAL

BACKGROUND OF THE INVENTION

This invention relates to carrier telephone communication systems and more particularly to a system for providing ringing voltage to the terminals of a telephone handset at a remote station terminal.

The rapid growth in population and the attendant increase in the demand for expanded telephone service has resulted in the widespread use of multiple channel carrier equipment for providing additional telephone service capability over existing cable pairs. A typical multiple channel carrier installation might include a central office station with one or more central office terminal units from each of which extends a two conductor transmission line, and each central office terminal unit includes a plurality of carrier channel units each including a carrier receiver section and a carrier transmitter section adapted to operate at different predetermined frequencies; a plurality of station terminals connected to each transmission line, each at a telephone subscriber location remote from the central office terminal. All of the station terminals include a receiver section operable at the same frequency as a transmitter section of one of said carrier channel units and a transmitter section operable at another frequency which is the same frequency as a receiver section of the same said channel unit. Power means are located at the central office terminals for supplying D.C. power to their respective transmission lines for operating their respective station terminal units, and means are provided in said station terminal unit for extracting the D.C. power from the transmission line for operating its receiver and transmitter sections.

In the conventional telephone systems which use a cable pair for each subscriber station, ringing voltage for operating the telephone signal bell is provided by a central office signaling panel and transmitted over the cable pair which is associated with the particular subscriber station telephone being signaled. The ringing voltage supplied to cable pair by the central office signaling panel is typically a 20 Hz A.C. voltage of about 70 volts peak value. This prior art signaling system cannot be used on telephone circuits having multiple channel carrier equipment installed therein as there are no provisions made in the conventional central office signaling unit for addressing one of a plurality of telephone stations connected to common cable pair.

The closest prior art known to applicants is U.S. Pat. No. 3,475,561 issued to L. Q. Krasin et al. The above prior art discloses a multiple channel carrier telephone system having provision for ringing a selected one of a plurality of remote station terminals. In this system, a pre-selected voice frequency tone corresponding to the remote station to be signaled is combined with the ringing voltage supplied by the central office signaling panel. A tone detector at the remote station terminal detects to the voice frequency tone and operates a ringing switching relay in response thereto. The main difficulty with this prior art system is that it requires the use of a ringing switching relay and a standby battery for ringing power. These equipments have proven to be less than trouble-free and to require routine maintenance.

SUMMARY OF THE INVENTION

Therefore it is an object of the present invention to provide a ringing voltage generator at a remote telephone station terminal that does not require the use of a ringing battery.

Another object of the present invention is to provide a ringing voltage generator that does not require the use of an electromechanical relay switch.

A still further object is to provide a ringing voltage generator that is insensitive to noise impulses which may be present on the telephone cable pair.

These and other objects are achieved in accordance with the principles of the invention by providing an oscillator and switching circuit for generating ringing voltage, said oscillator and switching circuit having time constant means to prevent accidental activation by noise impulses that may exist on the telephone cable pair.

BRIEF DESCRIPTION OF THE DRAWINGS

The principles of the invention as well as additional objects and features will be fully comprehended from the appended drawings, given as non-restrictive examples, in which.

DESCRIPTION OF A PREFERRED EMBODIMENT

Figure 1:
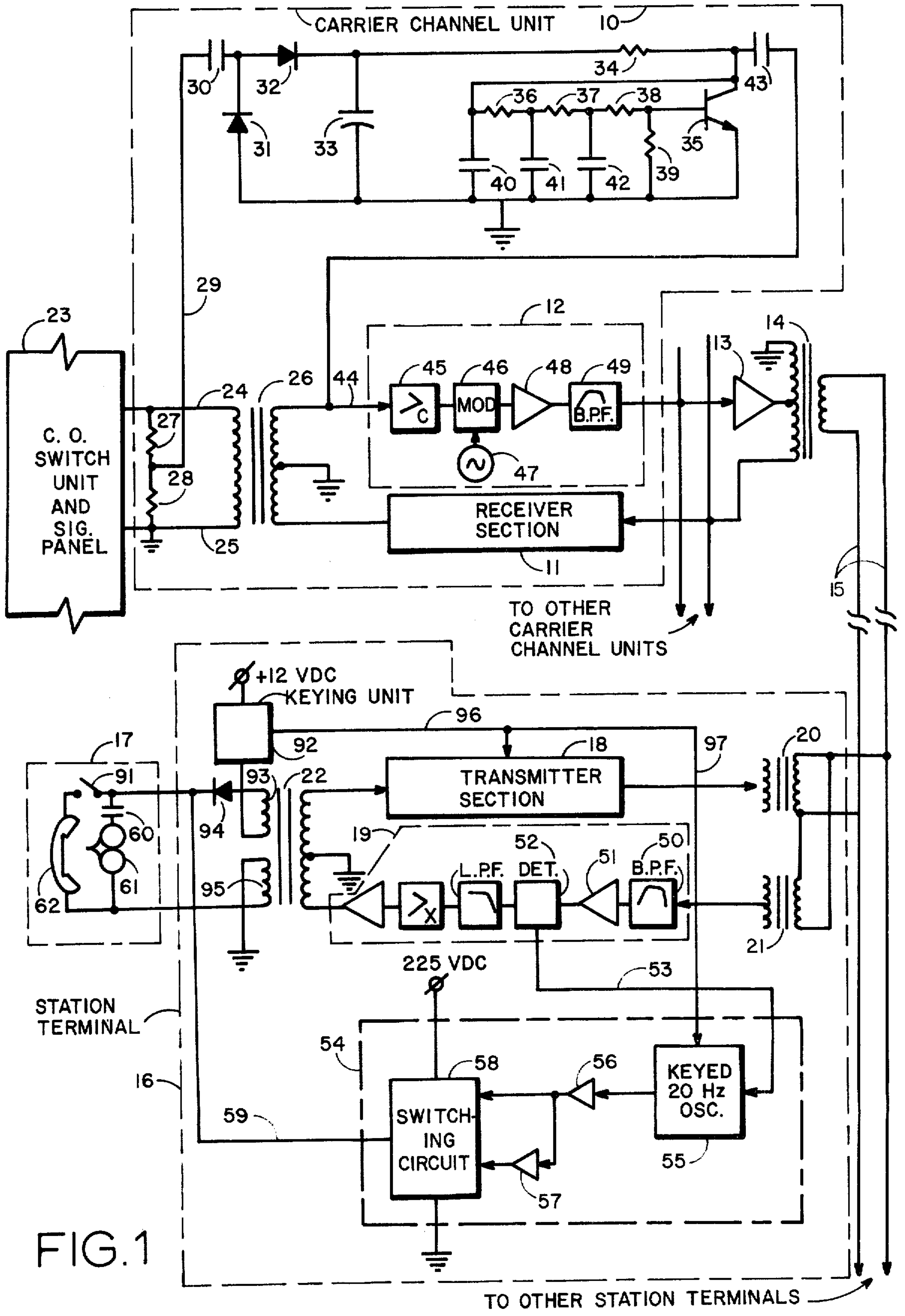
FIG. 1 is a simplified diagram of one channel of a multiple channel carrier telephone installation in which the present invention is embodied.

A multiple channel carrier telephone channel represented schematically in FIG. 1 and embodying the principles of the present invention comprises a carrier channel unit 10 which may be installed with other such carrier channel units at a conventional telephone central office. The carrier channel unit 10, receiver section 11 and a transmitter section 12 adapted to operate on a receive frequency and a transmit frequency which is preassigned to each carrier channel. Transmitter section 12 of carrier channel unit 10 is connected, in parallel with the transmitter sections of other carrier channel units, not shown, to a common transmit amplifier 13 and thence to the center top of the primary of a hybrid transformer 14. The secondary winding of transformer 14 is connected to a telephone cable pair 15.

Cable pair 15 is routed to remote subscriber telephone installations. Each carrier channel unit has associated therewith a station terminal 16 located at a subscriber telephone installation and interposed between cable pair 15 and the subscriber telephone 17. Station terminal 16 has a station terminal transmitter section 18 and a station terminal receiver section 19, coupled in parallel through transformers 20 and 21, respectively, to cable pair 15. Transmitter section 18 and receiver section 19 are coupled through a hybrid transformer 22 to the subscriber telephone 17. D.C. power at various voltages for operation of the station terminal is provided by a regulated power supply, not shown, which in turn is powered by D.C. power from the central office along cable pair 15 and through direct connections, also not shown, to the regulated power supply.

The operation of transmitting two-way voice communications via the multiple channel carrier telephone channel forms no part of the present invention and therefore will not be discussed in detail. A more complete description of the operation of a multiple channel carrier telephone system is set forth in applicant's copending U.S. application, Ser. No. 410475, now U.S. Pat. No. 3840706.

When a call originates within the telephone system directed to a particular subscriber telephone, the call is switched to the appropriate telephone output connections of a conventional central office switching unit and signal panel and a ringing voltage applied to the output connections for transmission to the subscriber telephone for activating the subscriber's telephone bell. With reference again to FIG. 1, a description will be given of the operation of a multiple channel carrier telephone channel incorporating the present invention.

A conventional central office switching unit and signaling panel 23 has a pair of output wires 24 and 25 addressed to subscriber station terminal 16. Output wires 24 and 25 are coupled to the carrier channel unit transmitter section 12 and receiver section 11 through a hybrid transformer 26 and thence to cable pair 15. When a call is directed to subscriber station terminal 16, a ringing voltage, generated within the switching unit and signaling panel 23, is directed to wires 24 and 25. The ringing voltage may be, for example, a voltage of 70 volt peak amplitude and 20 Hz frequency. A portion of the ringing voltage appears at a center connection between a pair of divider resistors 27 and 28 connected between wires 24 and 25. A wire 29 conducts the ringing voltage to coupling capacitor 30 and thence to a rectifier doubling circuit comprising diode 31, diode 32 and capacitor 33 where it is rectified in a well known manner to provide a D.C. voltage. The rectified D.C. voltage is conducted via load resistor 34 to the collector terminal of transistor 35. Transistor 35 and its associated feedback resistors 36, 37, 38 and 39 and capacitors 40, 41 and 42 form a phase shift oscillator circuit of a well known type. Feedback resistors 36, 37 and 38 and capacitors 40, 41 and 42 are sized such that transistor 35 oscillates at about 300 Hz. The 300 Hz tone signal output of oscillator transistor 35 is conducted through coupling capacitor 43 to an input lead 44 to carrier channel unit transmitter section 12.

In transmitter section 12, the 300 Hz tone signal is conducted through compressor unit 45 to a voice frequency input of modulator 46. A carrier frequency generator 47 provides a carrier frequency to a carrier frequency input to modulator 46, wherein it is modulated by the 300 Hz tone signal from oscillator transistor 35. The modulated carrier energy is amplified by carrier frequency amplifier 48 and thence through bandpass filter 49, common transmit amplifier 13 and hybrid transformer 14 to the telephone cable pair 15.

At the remote station terminal 16, the modulated carrier energy is conducted through transformer 21 to an input of station terminal receiver section 19, through bandpass filter 50 and carrier frequency amplifier 51 to a detector unit 52. In detector 52, the modulated carrier is demodulated to recover the 300 Hz tone signal which is conducted by a branch input lead 53 to ringing voltage generator 54.

Ringing voltage generator 54 comprises, essentially, a 20 Hz oscillator section 55, a first inverter circuit 56 and a second inverter circuit 57, and a switching circuit 58. Switching circuit 58 has an output lead 59 connected to subscriber telephone 17 and thence through a blocking capacitor 60 to a telephone bell 61.

Figure 2:
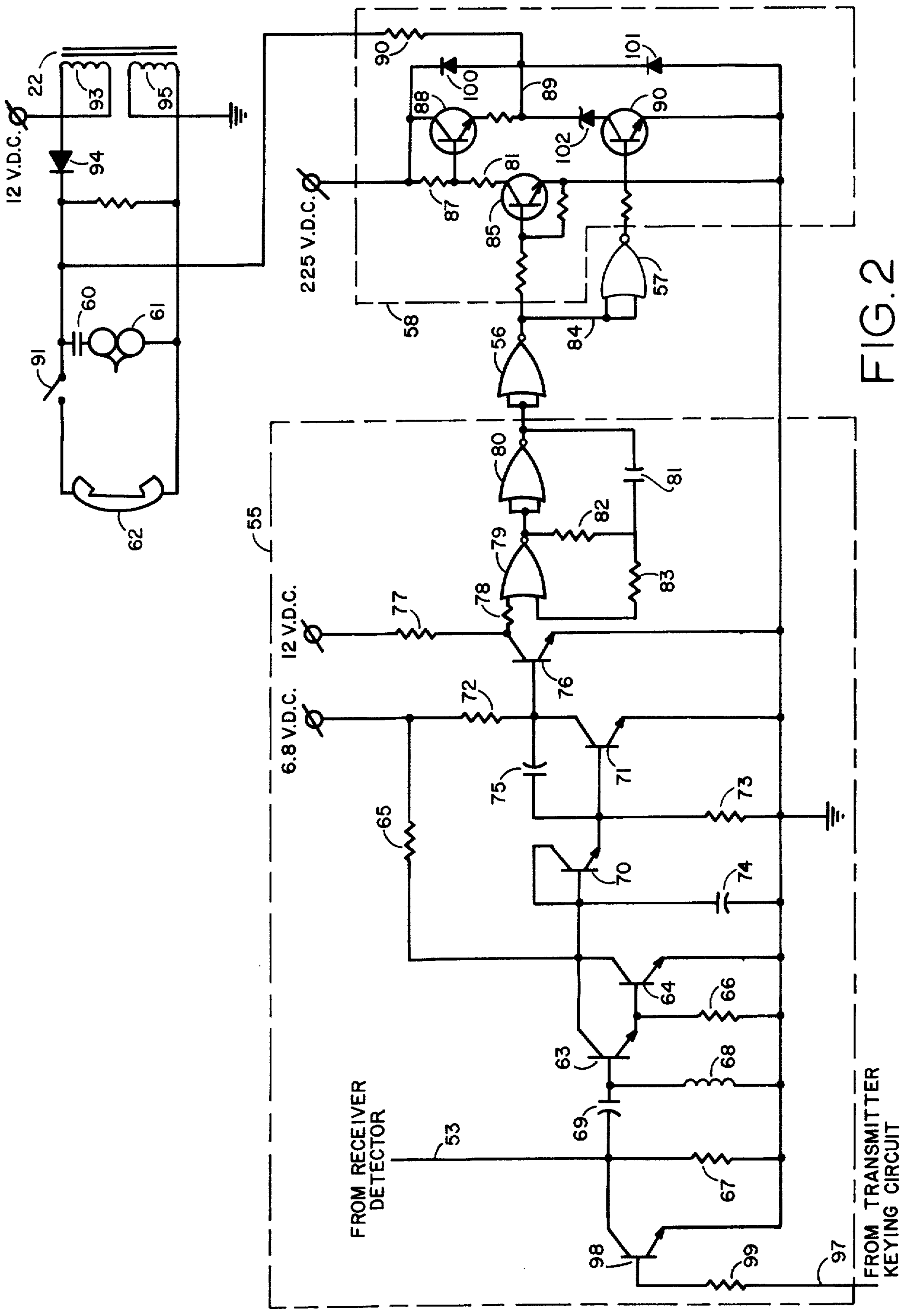
FIG. 2 is a schematic diagram of the ringing voltage generator circuit.

With reference now to FIG. 2, operation of the ringing voltage generator will be explained.

A 300 Hz ringing tone signal, generated in the central office carrier channel unit in response to the occurrence of a ringing voltage from the central office switching unit is transmitted via the channel carrier to the remote station terminal where it is detected in the station terminal receiver section and conducted by branch lead 53 to ringing voltage generator 54. In generator 54, the ringing tone signal is converted to a D.C. voltage by a Darlington-pair detector circuit comprising transistors 63 and 64, resistors 65, 66 and 67, inductor 68 and coupling capacitor 69. The D.C. output from the detector circuit is then fed to the input of an integrating amplifier comprising diode 70, transistor 71, resistors 72 and 73, and capacitors 74 and 75. Resistors 72 and 73, and capacitors 74 and 75 are sized such that the integrator has a predetermined time constand of about one second. The function of the integrator circuit is to prevent operation of the telephone bell by short duration noise impulses which might otherwise cause the telephone bell 61 to respond to random noise pulses picked up on the cable pair. The integrator output is fed to the input of an inverter circuit comprising transistor 76 and resistor 77. The inverted D.C. voltage is then fed through resistor 78 into a first input of a first "nand" gate 79. The output of gate 79 is fed to both inputs of "nand" gate 80. Gates 79 and 80 with their associated feedback circuit capacitor 81, and resistors 82 and 83 to the second input of gate 79 form a conventional 20 Hz square wave oscillator circuit. Thus, when a ringing tone signal is received at the ringing generator it is rectified to a D.C. voltage which activates the 20 Hz oscillator circuit. Onset of oscillations is delayed by the time constant of the integrating amplifier, thus preventing intermittent operation of the telephone bell by short duration noise pulses which may be picked up on the telephone cable pair. A time constant of about one second has been found to be suitable for this purpose.

The 20 Hz square wave is then fed to the inputs of a "nand" gate which forms first inverter 56. A second inverter circuit 56 is connected to the output of first inverter 56 through a branch lead 84.

The action of inverters 56 and 57 is such that when the input to inverter 56 is zero, the output of inverter 56 rises to a positive voltage, which in turn causes the output of inverter 57 to fall to zero voltage. When the input to inverter 56 rises to a positive voltage, its output falls to zero, and the output of inverter 57 rises to a positive voltage, thus the output of inverter 56 is positive, transistor 85 is caused to conduct drawing current through resistors 86 and 87. Voltage drop across resistor 87 biases transistor into a conducting state and thus applying 225 volt power supply voltage to output lead 89. When the output of inverter 56 drops to zero, the transistors 85 and 88 assume a non-conducting state, at the same time the output of inverter 57 rises to a positive voltage, thus biasing transistor 90 into a conducting state and causing output lead 89 to drop to ground potential. In this manner, a 20 Hz alternately square wave voltage is generated on output lead 89 causing current to flow through current limiting resistor 90 and capacitor 60 to a telephone bell 61, causing bell 61 to ring at the conventional 20 Hz telephone signal rate.

With reference again to FIG. 1, when telephone handset 62 is lifted in response to ringing of the bell 61, to cause an off-hook condition, a hook switch 91 closes and D.C. current from the station terminal power supply flows through keying unit 92, secondary winding 93 of hybrid transformer 22. Current flow through keying unit 92 is detected and causes operating voltage to be applied to station terminal transmitter section 18 via power lead 96. Keying unit 92 may comprise, for example, a transistor switch, such as is well known in the art, interposed between the station terminal power supply and power lead 96 and having its base connected through a resistor to secondary winding 93 so that when D.C. current flows through winding 93 the transistor switch is biased into a conducting state and D.C. current can flow from the station terminal power supply, through the transistor switch to power lead 96. According to the invention, transmitter operating power is also conducted to ringing voltage generator oscillator 55 through a branch lead 97.

With reference again to FIG. 2, when transmitter operating power is applied to lead 97, a transistor 98 is biased, through base resistor 99, into a conducting state causing lead 53 to be effectively shorted to ground potential. When lead 53 is shorted to ground potential, the 300 Hz tone input to transistor is grounded and operation of the ringing voltage generator ceases. In this manner, the bell 61 is deactivated when handset 62 is raised from its cradle.

Diodes 100 and 101 are provided across the output of the ringing voltage generator to protect transistors 88 and 90 from over-voltage surges caused by lightning, for example. A Zener diode 102 is provided in the collector circuit of transistor 90 and causing inadvertent operation of the station terminal transmitter section.

Although a preferred embodiment of the invention has been described in detail, it is to be understood that various changes, substitutions and alterations can be made in the steps of the invention without departing from the spirit and scope of the invention as defined by the appended claims.

What is claimed is:

1. A ringing voltage generator for activating a telephone bell for a carrier telephone station terminal comprising:

an oscillator adapted to oscillate in response to a ringing tone signal;

means cooperating with said oscillator for delaying onset of oscillations for a predetermined time interval following the onset of the tone signal;

means responsive to said oscillator for switching a power supply voltage on and off to form a pulsating current for activating the telephone bell; and means for disabling the oscillator whenever the station terminal telephone is in an off-hook condition.

2. A ringing generator is accordance with claim 1 wherein the oscillator is a square wave oscillator.

3. A ringing voltage generator in accordance with claim 1 wherein the means for delaying onset of oscillations is an integrating amplifier having a predetermined time constant.

4. A ringing voltage generator in accordance with claim 1 wherein the means for switching power supply voltage comprises a first inverter and a second inverter driving a first transistor switch and a second transistor switch respectively and having the inverters arranged to cause the first and second transistor switches to conduct alternately.

5. A ringing generator according to claim 1 wherein the means for disabling the oscillator is a transistor connected from a ringing tone signal input lead to a circuit ground and having its base connected to a source of station terminal transmitter operating power whereby the tone signal input lead is shorted to ground whenever operating power is applied to the station terminal transmitter.

* * * * *